UNITED STATES PATENT OFFICE.

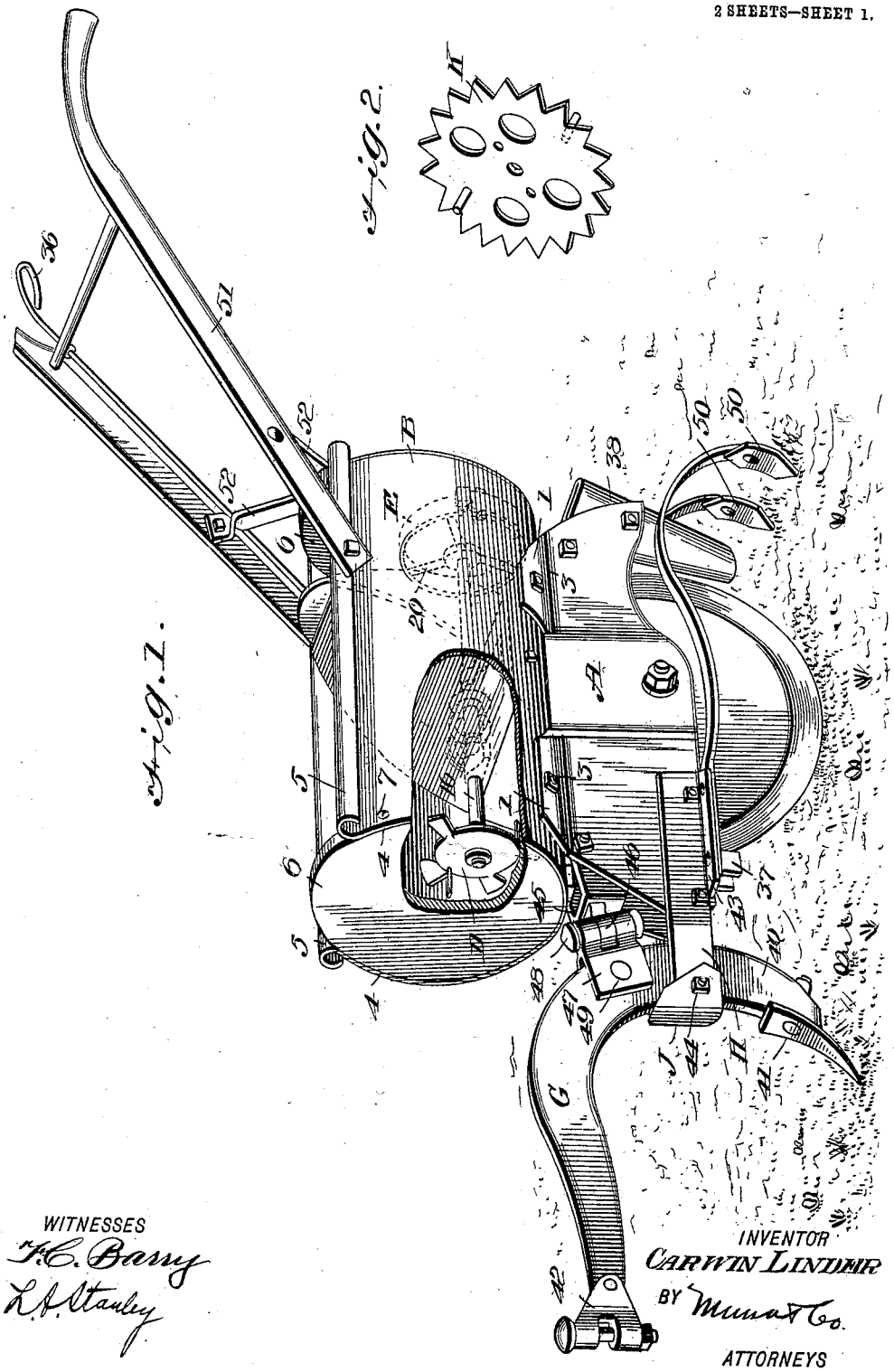

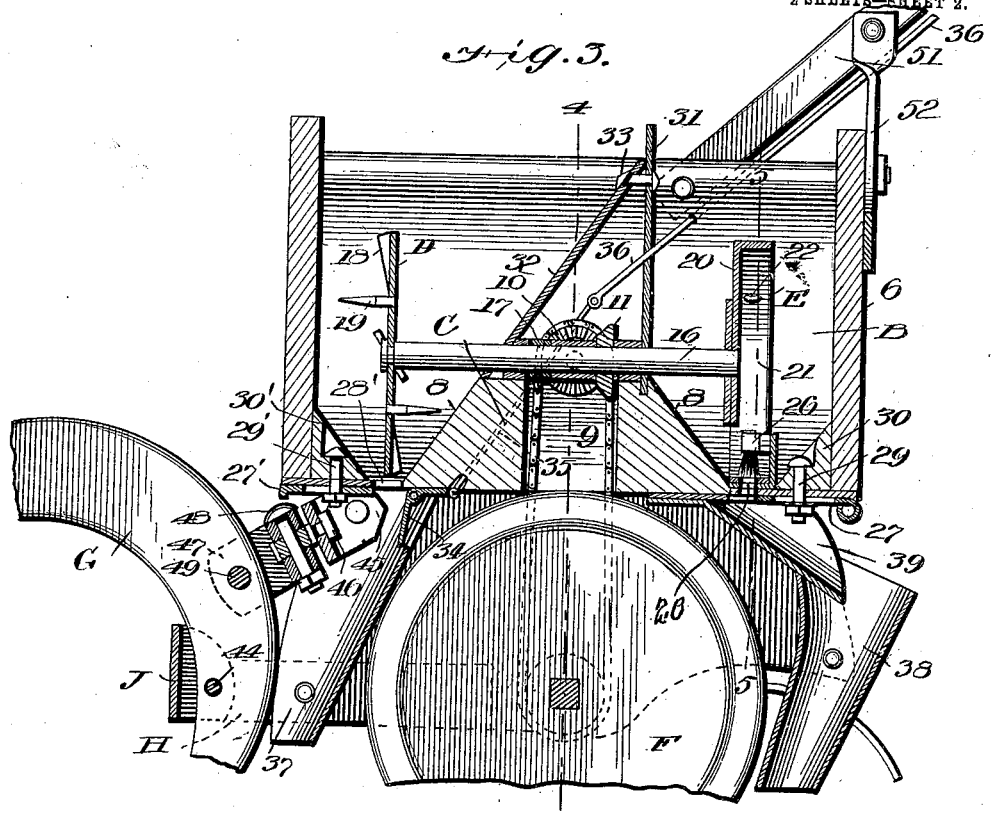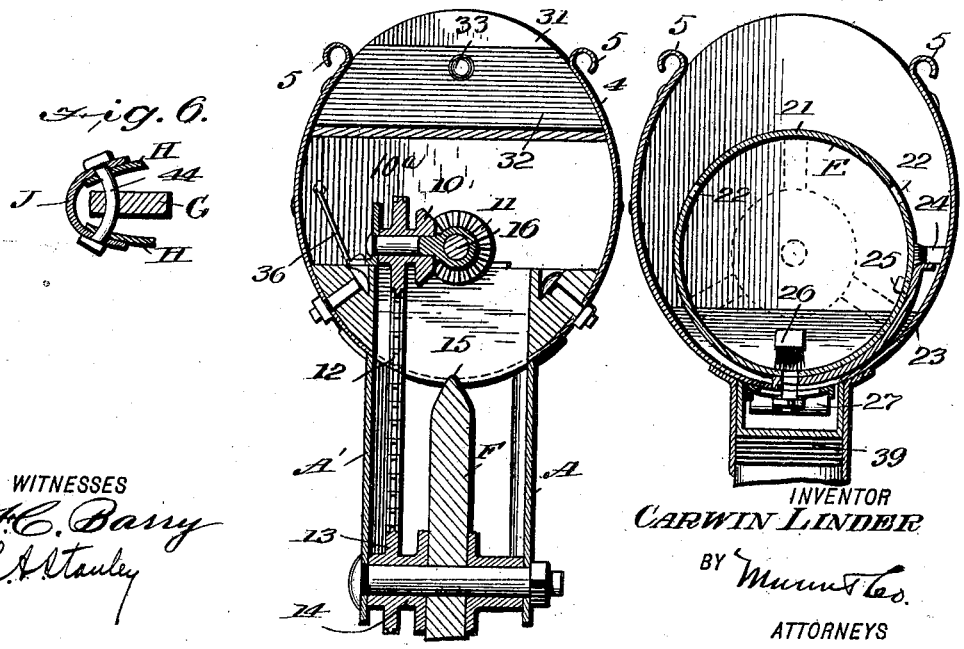

CARWIN LINDER, OF CONVERSE, SOUTH CAROLINA.

COMBINATION-PLANTER.

No. 922,922.  Specification of Letters Patent.  Patented May 25, 1909.

Application filed November 14, 1908. Serial No. 462,622.

*To all whom it may concern:*

Be it known that I, CARWIN LINDER, a citizen of the United States, and a resident of Converse, in the county of Spartanburg and State of South Carolina, have made certain new and useful Improvements in Combination-Planters, of which the following is a specification.

My invention relates to a combined planter and fertilizer and it consists in the combinations, constructions and arrangements hereinafter described and claimed.

An object of my invention is to provide a device which is simple in construction and has comparatively few operating parts, therefore rendering the device less liable to get out of order.

A further object of my invention is to provide a plow beam for use with the planter held in such a manner that the machine is self guiding.

A further object of my invention is to provide a novel form of hopper for the grain and for the fertilizer and means for feeding the fertilizer and the grain simultaneously.

Other objects and advantages will appear in the following specification and the novel features of the invention will be particularly pointed out in the appended claims.

My invention is illustrated in the accompanying drawings, in which—

Figure 1 is a perspective view showing one embodiment of my invention. Fig. 2 shows a detail view of an auxiliary feed wheel. Fig. 3 is a longitudinal sectional view of the device. Fig. 4 is a transverse section along the line 4—4 of Fig. 3. Fig. 5 is a transverse section of a portion of the device along the line 5—5 of Fig. 3, and Fig. 6 is a view showing the attachment of the plow beam to the yoke.

In carrying out my invention I provide two main frame plates A and A', which are both provided with upper curved flanges 1. Resting between the opposed flanges 1 of the plates A and A' and secured to these flanges by means of the bolt 3, is the cylindrical feed hopper B. This consists of the sheet metal sides 4, which are provided with the curved flanges 5 at the top thereof, as shown in the drawing. The ends of the cylindrical hopper are formed by means of wooden disks 6, being secured to the sides by means of the screws 7. Within the hopper I have provided the feed mechanism for feeding the fertilizer and the grain. To this end I provide a solid block of wood C, having sloping sides 8, as seen in Fig. 3, and provided with a central opening 9 extending through the block and registering with a similar opening in the bottom of the cylinder, as seen in Fig. 4. Upon the top part of this block C I journal the bevel gears 10 and 11. The former has upon it an integral sprocket wheel 10ª arranged to receive a sprocket chain 12 driven by a sprocket wheel 13 on the shaft 14 of the wheel F. The gear 11 is secured to the shaft 16 extending longitudinally of the feed hopper B, which is arranged for rotation in suitable bearings 17 secured to the top of the block C. On one end of the shaft there is arranged the wheel D, which is provided with the blades 18 and with the laterally extending arms 19, the latter being for the purpose of loosening and stirring up the charge of fertilizer, and the former being for the purpose of pushing the fertilizer toward the feed opening. To the opposite end of the shaft 16 is attached the seed dropper. This consists of the wheel E provided with the spokes 20 attached at one side of the rim 21. The latter is provided with a series of holes 22 into which the grain can drop, and is arranged to revolve against a circular plate 23 bearing at its upper end a brush 24. The plate 23 is provided with guide flanges 25 which embrace the edges of the wheel to guide it in its movement. On the inner side of the rim 21 I arrange a brush 26 which is immediately over registering openings in the plate 23 and the casing. Underneath the hopper at each end thereof I provide the slides 27 and 27' arranged to close the feed openings 28 and 28' and held in adjusted position by means of the bolts 29 and 29', which are secured to the wooden corner pieces 30 and 30' within the hopper.

The upright wooden partition 31 divides the hopper B into two parts. A forward part designed to hold fertilizing material while the rear part is designed for holding the grain. An inclined partition 32, extending from one side 4 to the other, forms a separate compartment for the gearing and protects the latter. This partition 32 forms an extension of the side 8 of the block C. A bolt 33 secures the partition 32 to the vertical partition 31. Arranged to close the feed opening 28' is the pivoted door 34. The latter is operable by means of the links 35 and 36, which pass through the cylinder B and may be manipulated by the operator of the device.

At the forward end of the cylinder is arranged the inclined chute 37 and at the rear is the seed spout 38. A downwardly inclined chute 39 delivers the seed from the opening 28 leading from the seed hopper.

Between the two tubes 37 and 38 is located the main wheel F. This is journaled between the side plates A and A' in the manner shown in Fig. 4 and is provided with the cutting edge 15 for the purpose of making a V-shaped trough into which the seed may be deposited.

At the forward end of the device is located the plow beam G. This consists of a curved member terminating in a foot 40 provided with a removable share or blade 41 having at its forward end a draft clevis 42. The plow beam G is secured in a peculiar manner to the plates A and A', and the connecting device forms one of the main features of my invention. At the forward ends of the plates A and A' I attach the plates H, which are provided with loosely extending flanges 43. The forward ends of these plates H are curved as shown in Fig. 6 and a curved bolt 44 is passed through these plates and through the beam G, the ends of the plates H being held together by means of the curved stirrup J. The construction thus described forms a yoke having a curved connecting member passing through the beam, along which the latter may be shifted. I also attach to the inner sides of the plates A and A' a U-shaped member 45. Passing through an opening in the central part of the member 45 is the pivot bolt 46. This member has an expanded end which is perforated and arranged to fit between the arms of a clevis 47, being held therein by a pivot bolt 48, as shown in Figs. 1 and 3. This provides a universal joint and the plow beam is attached to this joint at 49. The spring arms carry blades 50 and are attached to the flanges 43 and extend backwardly to the rear of the device in such position that when the seed are deposited they will cause the earth to cover the seed as the machine moves forward. The handles 51 are attached to the sides 4 of the device and are braced by the end braces 52 in the usual manner.

From the foregoing description of the various parts of the device the operation thereof may be readily understood. In the use of the device fertilizer is deposited in the forward part of the hopper while the corn or other grain is deposited in the rear end. As the device is drawn along the plow 41 opens a furrow. The motion of the wheel F through its connection with the sprocket wheel 13 imparts motion to the gears 10 and 11, the latter driving the shaft 16. As the wheel D turns it loosens up the fertilizer by means of the arms 19 and pushes it over the feed opening 28' by means of the arms 18. The fertilizer then falls down the chute in front of the wheel F. The latter makes a V-shaped furrow for the reception of the seed. During the revolution of the wheel E the grain enters the holes 22, the brush 24 preventing the entrance of any grain between the wheel and the plate 23. As the grain passes underneath the brush 26, the latter forces the seed through the opening into the chute 39 and thence through the grain spout 38 into the furrow which is immediately covered by the blades 50. In case the operator should wish to close or restrict the opening 28', thereby discontinuing the distribution of the fertilizer, he may pull on the rod 36, which causes the door 34 to close the feed opening. The feed openings 28 and 28' may also be regulated by the slides 27 and 27'.

In Fig. 2 I have shown an auxiliary wheel K, which may replace the dropping wheel E when small grain, such as wheat or oats is to be planted. When this wheel is used the slide 27 may be pushed inward until the bolt opening registers with the opening 28, thereby leaving a small slot through which the grain can pass and which is proportional to the thickness of the wheel K.

It will be observed that this device is practically self guiding, for when the horse turns in one direction the plow will be tipped in the opposite direction so as to remove the soil from the opposite side of the furrow. This tipping movement is caused by the conjoint action of the fastening means for the plow beam, there being three distinct motions. First, a lateral movement of the beam G on the bolt 44 between the plates H, second, a slight relative movement of the parts 47 and 45 on the hinge bolt 48, and third, a rotary movement of the bolt 46 in its stirrup 45. This guiding movement renders the steering of the plow by means of the handles far less difficult than it would otherwise be. At the same time the construction is an exceedingly simple one and is not likely to get out of order.

I am aware that other forms of the device based upon the same general idea might be made, but I regard as my own and desire to claim all such modifications as fairly fall within the spirit and scope of the invention.

I claim—

1. In a combination planter, a pair of opposed side plates, a cylindrical feed hopper carried thereby, a single wheel journaled between said plates underneath said feed hopper, and a plow movably secured to said side plates and provided at its forward end with draft means.

2. In a combination planter, a pair of opposed side plates, a cylindrical feed hopper carried by said plates, a single wheel journaled between said plates underneath said feed hopper, gearing disposed within said feed hopper, means for driving said gearing from said wheel, and feeding means within said feed hopper driven by said gearing for feeding material from said hopper at both ends thereof.

3. In a combination planter, a pair of opposed side plates, a feed hopper carried by said side plates and divided into compartments, feed spouts leading from said compartments, a wheel journaled between said plates underneath said hopper, and a plow beam secured to said side plates in front of said wheel and having flexible connection therewith to permit of a tilting motion.

4. In a combination planter, a pair of opposed side plates provided with extensions, a single wheel journaled between said side plates, a feed hopper supported by said side plates above said wheel, a plow beam disposed between said extensions, a curved bolt movably securing said plow beam to said extensions, and a universal joint movably securing said plow beam to said side plates.

5. In a combination planter, a pair of opposed side plates, a wheel journaled between said side plates, a cylindrical hopper supported by said side plates, said hopper comprising two receptacles separated by an upright partition, gearing located within said hopper and arranged to operate feed mechanism in each of said compartments, an inclined partition connected with said upright partition for protecting said gearing and for forming an inclined side for one of said compartments, and means for communicating power to said gearing from said wheel.

6. In a combination planter, a pair of side plates, a wheel journaled between said side plates, feed spouts secured at the ends of said side plates, a cylindrical feed hopper supported by said side plates and communicating with said feed spouts, a centrally disposed block secured within said feed hopper and provided with an opening therethrough registering with an opening in the bottom of said hopper, intermeshing bevel gears carried by said block, a longitudinally extending shaft supported upon said block and arranged to be turned by said gears, an upright partition extending from one corner of said block, and an inclined partition extending from the other corner of said block and being secured to the upper end of said upright partition.

7. In a combination planter, a feed hopper, an upright partition dividing said feed hopper into two compartments, a shaft disposed longitudinally within said feed hopper and extending through said partition, means for causing the revolution of said shaft, a feed wheel at one end of said shaft in one compartment comprising blades and laterally extending arms, and a feed wheel at the other end of said shaft in the other compartment comprising a wheel provided with openings in its rim, a curved strip secured to the sides of said hopper adjacent the periphery of said wheel, a brush carried at the top of said curved strip, and a brush carried by said hopper and arranged to engage with the inner side of the rim for forcing the grain through the openings in said rim.

CARWIN LINDER.

Witnesses:
H. V. STRIBLING,
THOS. D. LADSHAW.